Feb. 2, 1965   W. W. MURPHY   3,168,359
COMBINED RADIAL AND DUAL THRUST BEARING FOR SHAFTS
Filed Feb. 25, 1963

WILLIAM W. MURPHY
INVENTOR

BY Mason, Porter, Miller & Stewart

ATTORNEYS 3,168,359
Patented Feb. 2, 1965

3,168,359
COMBINED RADIAL AND DUAL THRUST
BEARING FOR SHAFTS
William Walter Murphy, Torrington, Conn., assignor to
The Torrington Company, Torrington, Conn., a corporation of Maine
Filed Feb. 25, 1963, Ser. No. 260,531
14 Claims. (Cl. 308—174)

The specification which follows relates to novel improvements in a combined radial and dual thrust bearing for shafts, having evident advantages in assembly and operation for supplying antifriction support to the shaft and at the same time withstanding axial thrust in both directions.

Numerous installations require an antifriction bearing for a shaft which will support the latter in a radial direction and at the same time withstand axial or longitudinal stresses. A typical example of such an installation is the drive shaft of a rotary pump such as is used with internal combustion engines. Here the pump shaft carries an impeller at one end. The shaft must be carried in an antifriction bearing supported on an engine block or the like. Rapid assembly requires that the antifriction bearing has been previously assembled with the shaft so that the two may be installed as a unit.

One of the objects of this invention is to form an antifriction bearing for a shaft which will withstand thrust in both axial directions.

Another object of the invention is to provide an assemblage of an antifriction bearing on a shaft so that the two may be handled as a unit in installation.

A still further object of the invention is to provide a radial bearing in combination with a dual thrust bearing in final position on a rotary shaft so that the assemblage may be installed as a unit.

A still further object of the invention is to make the antifriction bearing of parts which may be assembled in the desired position on the shaft and firmly retained in place for use.

Among the objects of the invention is to provide a combined antifriction bearing of the above type in which an initial filling of lubrication will be retained without material loss over a long period.

A still further object of the invention is to arrange the parts of the bearing so that it is dust repellant with a minimum prospect of wear or deterioration.

Other objects of the invention will be apparent from the following description of the preferred form of the invention as illustrated on the accompanying drawings in which.

Briefly stated, the invention comprises an antifriction bearing unit which may be assembled on a rotary shaft and then set in a housing, frame or the like. Thus the shaft is free to rotate. At the same time it is restrained from axial movement in each direction. By the use of thin, ductile sheet metal for the outer race of the bearing, a minimum of clearance is obtained. Also, the assembly of the several parts and their permanent fastening is facilitated. The bearing unit so constructed on the shaft provides a maximum of rolling contact. Also, the unit will contain lubricant for a long period without risk of draining off. It is further to be noted that this bearing fits onto the shaft so closely as to be substantially dust proof.

Figure 1:
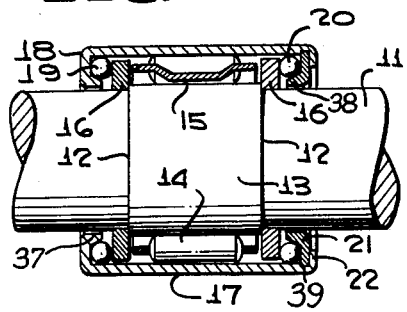
FIGURE 1 is a side elevation partly in section of one form of the invention using a caged roller bearing and thrust collars against a shaft.

As illustrated on FIGURE 1, the rotary shaft 11 has right-angled shoulders 12, 12 providing an intermediate race portion 13 of relatively greater diameter. This portion constitutes the inner race of the antifriction radial bearing.

A series of rollers 14 ride upon the inner race 13. The rollers are spaced apart and held in positions parallel to the axis of the shaft by means of a cage 15.

Thrust collars 16, 16 fit closely around the shaft 11 and fit against the shoulders 12, 12.

An outer race member 17 made of thin ductile sheet metal or like material, has an inside diameter that fits closely around the rollers 14. One end of the member 17 is extended and turned perpendicular to the shaft to form a flange 18. This flange has an inturned lip 37 slightly spaced from the surface of the shaft 11.

A series of bearing balls 19 fit within the flange 18 so that they have three point contacts with the inner surface of the member 17, and with the flange 18 as well as against the surface of the thrust collar 16.

The opposite end of the race member 17 extends beyond the corresponding thrust collar 16. This provides space to receive a series of bearing balls 20, which rest against the thrust collar 16. Outwardly from the balls 20 there is provided a thrust race 21 in the form of a ring having an inturned lip 38.

Thus the balls 20 have three point contacts with the thrust collar 16, the inner surface of the member 17 and the inner surface of the thrust race 21.

The thrust race may have an outer diameter slightly greater than the normal inner diameter of the member 17. The latter is cut back at this point to form a shallow groove 39 in which the race 21 fits tightly.

A down-turned end 22 of the member 17 forms a permanent fastening for the thrust race 21.

This form of the bearing is readily assembled upon the race 13, first by fitting the balls 19 into the flange 18, retaining them in place with the adjacent collar 16. The member 17 with the thrust collar 16 is then provided with the radial bearing unit comprised by the rollers 14 and its cage 15.

By slipping these parts over the left end of the shaft 11, the thrust collar 16 is brought against the shoulder 12. The opposite thrust collar 16 is then fitted from the right-hand end of the shaft 11 against the corresponding shoulder 12. Providing the balls 20 against last-named collar 16; fitting the thrust race 21 against them and turning down the end 22, completes the assembly.

This provides an antifriction bearing around the shaft with a minimum necessary diameter. The assembly meets the requirement for an antifriction radial bearing flanked by a thrust bearing at each end so that the shaft is restrained from axial movement in either direction.

Figure 2:
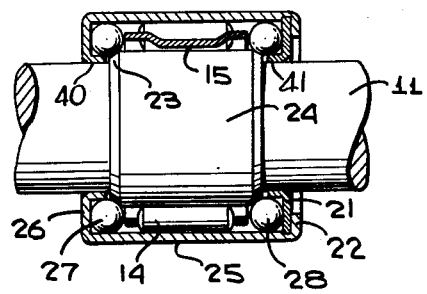
FIGURE 2 is a similar view of a second form without the thrust collars.

In FIGURE 2 the rotary shaft 11 is provided as a seat or race for the bearing rolls. Thus the shaft 11 has sloping or oblique shoulders 23, 23 on opposite ends of the inner race 24 of greater diameter than the shaft itself.

The rollers 14 and the cage 15 correspond to those already described above.

The outer race member 25 is turned down at the left end as shown at 26 to provide an end with an inturned lip 40 closely adjacent to but slidable on the shaft 11.

In this form the bearing balls 27 are larger than in the previous form. The balls 27 are large enough to rest against the sloping shoulders 23. The balls 27 at the left end have rolling contact also with the inner diameter of the outer race member 25 and its end flange 26.

The bearing balls 28 at the right end of the unit are also enlarged and extend in contact between the inner surface of the outer race member 25 and the shoulder 23.

A thrust race 21 as above described is fitted within the open end of the outer race member 25 and into contact with the balls 28. The thrust race 21 has an inturned lip 41 which separates the balls 28 from the shaft 11 and holds them against the shoulder 23 and the outer race member 25.

A down-turned end 22 at the end of the member 25 serves to hold the assembly in permanent position on the shaft 11.

Figure 3:
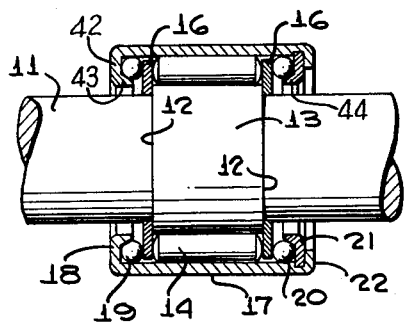
FIGURE 3 is a side elevation partly in section of the invention using a full complement of rollers and thrust collars.

In such instances where the bearing rollers are supplied as a full complement, that is the side-by-side contact without a retainer or cage, the assembly is made as shown in FIGURE 3. Thus the shaft 11 has right-angled shoulders 12, 12, and this provides an inner race 13 of enlarged diameter.

The full complement of rollers 14 extends substantially the full length of the inner race 13. The thrust collars 16, 16 resting against the shoulders 12, 12, serve to maintain the rollers in normal operating positions.

The outer race member 17 has projecting ends extending over the normal diameters of the shaft 11. As shown in FIGURE 3, at the left end there is an inturned end 42 with a slight lip 43. This flange provides a channel in which to carry a series of bearing balls 19. These rest on the thrust collar 16, the inner surface of the outer race member 17 and the flange 18.

At the right there is a corresponding series of bearing balls 20 riding upon the thrust collars 16 and the inner surface of the outer race member 17. Beyond the balls there is a thrust race 21 having an inner lip 44 thus providing a channel in which the balls roll.

The race 21 is confined within the outer race member 17 which is provided at this point with a grooved inner surface to receive the thrust race 21. A down-turned right flange 22 on the outer race member 17 serves to hold the thrust race 21 in place.

Figure 4:
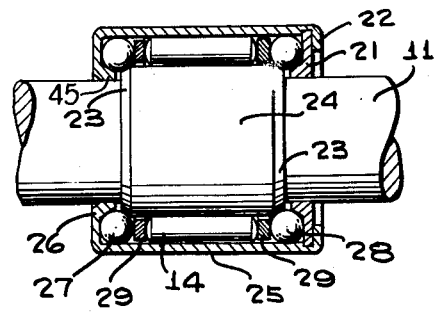
FIGURE 4 is a similar view of a full complement bearing but no thrust collars.

The use of a full complement of rollers and flanking series of balls journaled directly upon the shaft 11 is shown in FIGURE 4. Here the shaft 11 has sloping or oblique shoulders 23, 23 upon which the balls may roll.

The area between the shoulders 23, 23 constitutes an inner race member 24. This serves to carry a full complement of rollers 14.

Beyond the opposite ends of the rollers 14 and still within the area of the race member 24, there are two end rings 29, 29. These assist in maintaining the rollers in operating positions.

The outer race member 25 fits around the rollers 14 and has extended ends. The left end of the outer race member 25 is formed with a down-turned flange 26 having an inturned lip 45. A series of bearing balls 27 fit within this end of the race member 25 and thereagainst the shoulder 23 on the shaft, the inner surface of the outer race member 25 and the flange 26.

At the opposite end the outer race member is extended to provide space for a thrust race 21. This fits around the shaft 11 and is seated within a grooved portion of the outer race member 25. This thrust race holds the series of bearing balls 28 in place with three points of contact, namely the shoulder 23, the inner surface of the outer race member 25 and the thrust race itself. A down-turned flange 22 at the end serves to hold the parts firmly in position.

Figure 5:
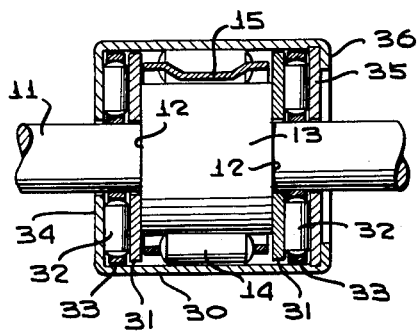
FIGURE 5 is a side elevation partly in section of the invention using a caged roller bearing and roller thrust bearings and FIGURE 6 is a similar view using a full complement roller bearing and a roller thrust bearing.
Figure 6:
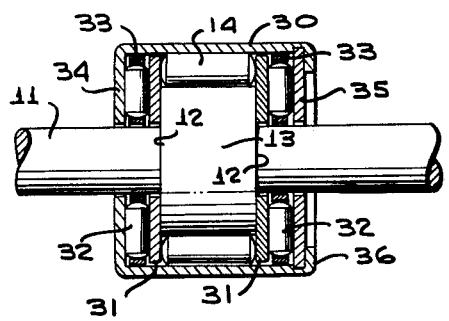

The invention is also adapted for use with roller thrust bearings as illustrated in FIGURES 5 and 6. In FIGURE 5, the shaft 11 is provided with the upstanding or right-angled shoulders 12, 12. This provides the inner race 13 of enlarged diameter. This permits the inner race to have a diameter materially greater than in the former forms of the invention, thus increasing the area of rolling contact.

The rollers 14 are held in place over the race 13 by means of a cage 15.

The outer race 30 extends beyond the inner race 13 to provide space for opposite roller thrust bearings. For this purpose thrust collars 31, 31 rest against the shoulders 12, 12.

These collars form parts of roller thrust bearings in which a series of rollers 32, 32 are provided radially disposed with respect to the shaft. These rollers are held in retainers or cages 33, 33.

At the left end, the outer race member has a down-turned flange 34. This also serves as a thrust member for the rollers 32.

At the opposite end the rollers 32 are supported by a thrust collar 35 fitted within a groove of the outer race member 30. A down-turned flange 36 holds the assembly together as a unit.

The use of roller thrust bearings in conjunction with a full complement of rollers is shown in FIGURE 6. Here the shaft 11 also has upstanding right-angled shoulders 12, 12, providing a greatly enlarged inner race member 13. The rollers 14 are assembled in full complement, that is in side-to-side contact without a retainer. The outer race member 30 surrounds the rollers 14. Thrust collars 31, 31 fit the shoulders 12, 12 and confine the ends of the rollers 14.

A series of rollers 32 radially disposed in a cage 33 rests against the left thrust collar 31. The rollers are held in place by means of the flange 34 which serves as a race member.

The opposite end of the outer race member contains a second series of thrust rollers 32 within a cage 33. An outer thrust collar 35 fits against the rollers 32 and within a groove of the outer race 30. A down-turned flange 36 resting against the thrust collar 35 also holds the bearing in place and together with the shaft 11.

It will be apparent that the invention may be embodied as a bearing unit in which the inner race is independent of the shaft. In such case the inner race member is hollow and the bearing unit will be separately assembled for ultimate mounting on a shaft or the like.

Regardless of the specific forms severally described above in detail, the invention provides an advantageous and economical antifriction bearing which combines both a radial bearing element and opposing thrust bearings. It is thus an important adjunct for a rotary shaft in which axial movement in both directions is to be prevented. The nature of the construction is such that the minimum outside diameter is needed. The features are such as to promote the retention of lubricant and resistance to the entry of dust and the like.

Various minor details of construction, material and design are possible within the scope of the invention as defined in the following claims.

What I claim is:

1. A combined radial and dual thrust bearing, comprising a shaft having an enlarged central portion forming an inner race member, a series of bearing rollers on said race member, an outer race member of thin ductile material surrounding said rollers, said outer race member having ends beyond the inner race member forming chambers, a series of thrust members in each chamber and abutment means for said thrust members against the opposite ends of the inner race member.

2. A combined radial and dual thrust bearing comprising a shaft having an enlarged central portion forming an inner race, a series of bearing rollers on said race, an outer race member surrounding said rollers, said race member having ends beyond the inner race forming bearing chambers, a series of thrust members in each chamber, and abutment means for said thrust members against the opposite ends of the inner race.

3. A combined radial and dual thrust bearing comprising a shaft having an enlarged central portion forming an inner race, contiguous bearing rollers on said race, retaining rings around the shaft adjacent the rollers, an outer race member surrounding said outer rollers, said race member having ends beyond the inner race forming bearing chambers, a series of thrust members in each chamber, and abutment means for said thrust members against the opposite ends of the inner race.

4. A combined radial and dual thrust bearing comprising a shaft having an enlarged central portion forming an inner race with sloping ends, comprising a series of bearing rollers on said race, retaining rings around the shaft adjacent the rollers, an outer race member surrounding said rollers, said race member having ends beyond the inner race forming bearing chambers, a series of bearing balls in one chamber engaging the sloping end of the shaft, the outer race member and its end, a thrust race in the opposite chamber and a series of bearing balls in said chamber engaging the sloping end of the shaft, the outer race and the thrust race 5. A combined radial and dual thrust bearing comprising a shaft having an enlarged central portion forming an inner race with sloping ends, comprising a series of contiguous bearing rollers on said race, retaining rings around the shaft adjacent the rollers, an outer race member surrounding said rollers, said race member having ends beyond the inner race forming bearing chambers and a series of bearing balls in one chamber engaging the sloping end of the shaft, the outer race member and its end, a thrust race in the opposite chamber and a series of bearing balls in said chamber engaging the sloping end of the shaft, the outer race member and the thrust race.

6. A combined radial and dual thrust bearing comprising a shaft having an enlarged central portion forming an inner race with perpendicular ends, comprising a series of contiguous bearing rollers on said race portion, retaining rings around the shaft beyond the perpendicular ends of the race portion, an outer race member having ends beyond said retaining rings forming bearing chambers, a series of thrust bearing members in one chamber engaging one retaining ring and the end of the outer race member, a thrust race in the opposite chamber and a series of thrust members in the opposite chamber engaging the adjacent retaining ring, and the said thrust race.

7. A combined radial and dual thrust bearing comprising a shaft having an enlarged central portion forming an inner race with perpendicular ends, comprising a series of contiguous bearing rollers on said race, retaining rings around the shaft beyond the perpendicular ends of the race, an outer race member having ends beyond said retaining rings forming bearing chambers, a series of bearing balls in one chamber engaging one retaining ring and the end of the outer race member, a thrust race in the opposite chamber and a series of bearing balls in the opposite chamber engaging the adjacent retaining ring and the said thrust race.

8. A combined radial and dual thrust bearing comprising a shaft having an enlarged central portion forming an inner race with perpendicular ends, comprising a series of contiguous bearing rollers on said race, retaining rings around the shaft beyond the perpendicular ends of the race, an outer race member having ends beyond said retaining rings forming bearing chambers, a series of radially disposed bearing rollers in one chamber engaging one retaining ring and the end of the outer race member, a thrust race in the opposite chamber and a seires of radially disposed bearing rollers in said chamber engaging the adjacent retaining ring and said thrust race.

9. A combined radial and dual thrust bearing comprising a shaft having an enlarged central portion forming an inner race, comprising a series of bearing rollers in a cage on said race, an outer race member surrounding said rollers, said race member having ends beyond the inner race forming bearing chambers, a series of thrust members in each chamber, and abutment means for said thrust members in said chambers at the opposite ends of the inner race.

10. A combined radial and dual thrust bearing comprising a shaft having an enlarged central portion forming an inner race with sloping ends, comprising a series of bearing rollers in a cage on said face, an outer race member surrounding said rollers, said race member having ends beyond the inner race forming bearing chambers, a series of thrust members in each chamber, and abutment means for said thrust members in said chambers at the opposite ends of the inner race.

11. A combined radial and dual thrust bearing comprising a shaft having an enlarged central portion forming an inner race with sloping ends, comprising a series of bearing rollers in a cage on said race, an outer race member having ends beyond the inner race forming bearing chambers, a series of bearing balls in each chamber, and abutment means for said balls in said chambers at the opposite ends of the inner race.

12. A combined radial and dual thrust bearing comprising a shaft having an enlarged central portion forming an inner race with perpendicular ends, comprising a series of bearing rollers in a cage on said race, retaining rings around the shaft beyond the perpendicular ends of the race, an outer race member having ends beyond said retaining rings forming bearing chambers, a series of thrust bearing members in one chamber engaging one retaining ring and the end of the outer race member, a thrust ring in the opposite chamber and a series of thrust members in the opposite chamber engaging the adjacent retaining ring and the said thrust race.

13. A combined radial and dual thrust bearing comprising a shaft having an enlarged central portion forming an inner race with perpendicular ends comprising a series of bearing rollers in a cage on said race, retaining rings around the shaft beyond the perpendicular ends of the race, an outer race member having ends beyond said retaining rings forming bearing chambers, a series of thrust bearing balls in one chamber engaging one retaining ring and the end of the outer race member, a thrust race in the opposite chamber and a series of bearing balls in the opposite chamber engaging the adjacent retaining ring and said thrust race.

14. A combined radial and dual thrust bearing comprising a shaft having an enlarged central portion forming an inner race with perpendicular ends, comprising a series of bearing rollers in a cage on said race, retaining rings around the shaft beyond the perpendicular ends of the race, an outer race member having ends beyond said retaining rings forming bearing chambers, a series of radially disposed bearing rollers in one chamber engaging one retaining ring and the end of the outer race member, a thrust race in the opposite chamber and a series of radially disposed bearing rollers in said chamber engaging the adjacent retaining ring and said thrust race.

References Cited by the Examiner

UNITED STATES PATENTS

| | | | |
|---|---|---|---|
| 2,208,724 | 7/40 | Griswold | 308—174 |
| 2,404,084 | 7/46 | Norton | 308—174 |
| 2,839,343 | 6/58 | Bensch | 308—174 |
| 3,043,634 | 7/62 | Coley. | |

FOREIGN PATENTS

| | | |
|---|---|---|
| 840,940 | 6/52 | Germany. |
| 966,513 | 8/57 | Germany. |

ROBERT C. RIORDON, *Primary Examiner.*